Jan. 19, 1932. G. R. HOFFMAN 1,841,532
OPERATING MECHANISM FOR CRANE BRAKES
Filed March 12, 1928 3 Sheets-Sheet 1

INVENTOR
George R. Hoffman
BY
ATTORNEY

Jan. 19, 1932.     G. R. HOFFMAN     1,841,532
OPERATING MECHANISM FOR CRANE BRAKES
Filed March 12, 1928     3 Sheets-Sheet 2
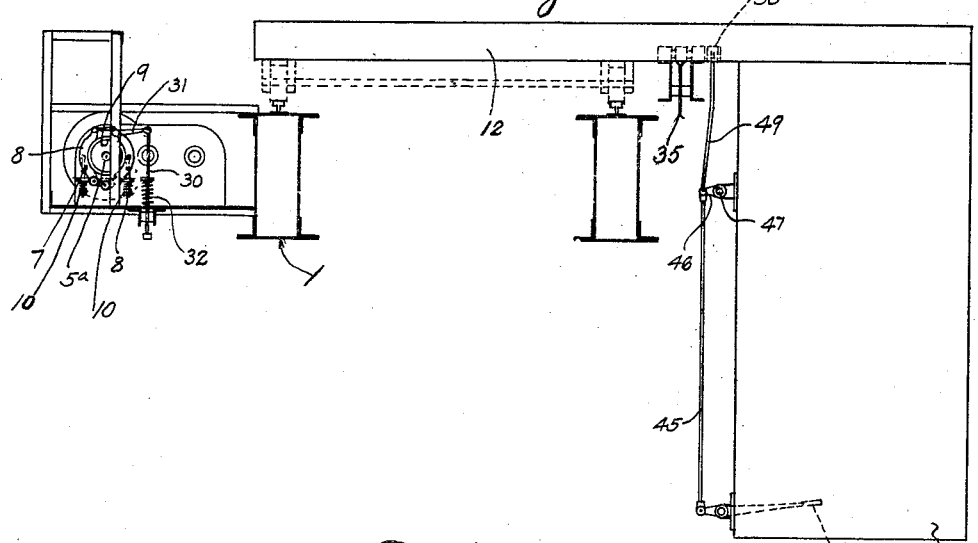
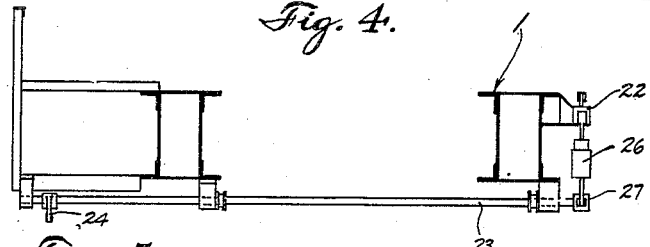
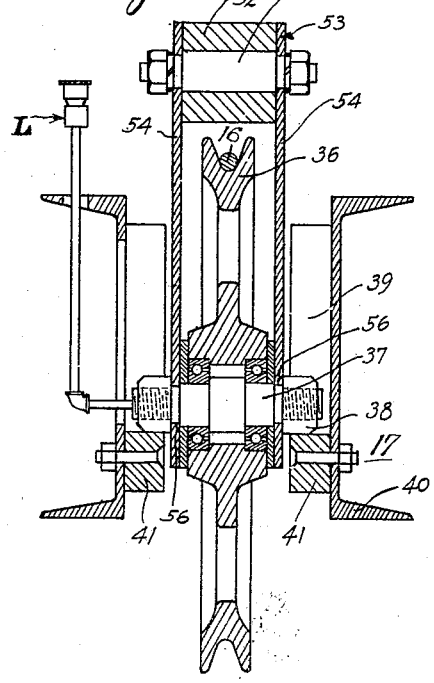
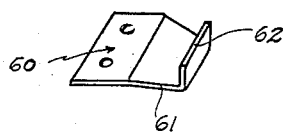
INVENTOR
George R. Hoffman
BY
ATTORNEY Jan. 19, 1932. G. R. HOFFMAN 1,841,532
OPERATING MECHANISM FOR CRANE BRAKES
Filed March 12, 1928 3 Sheets-Sheet 3
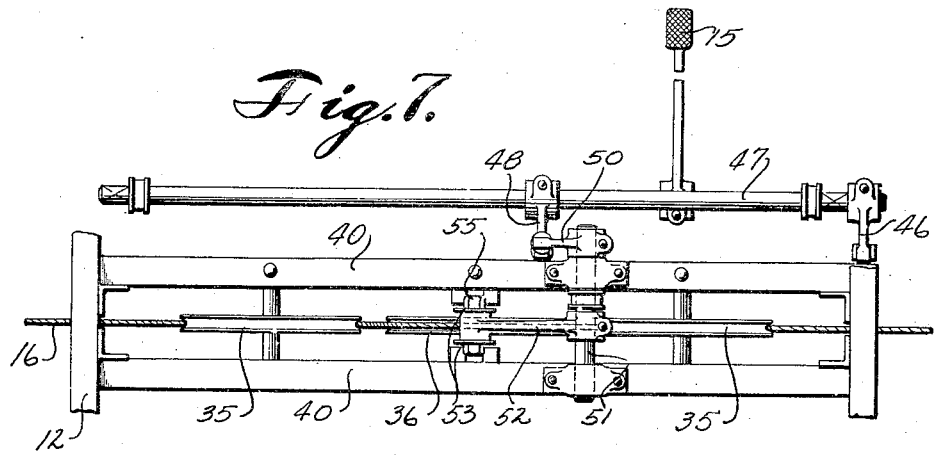
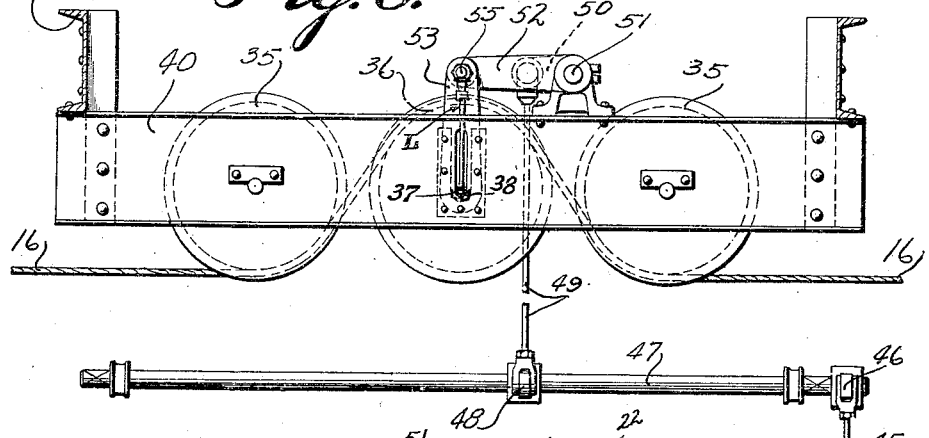
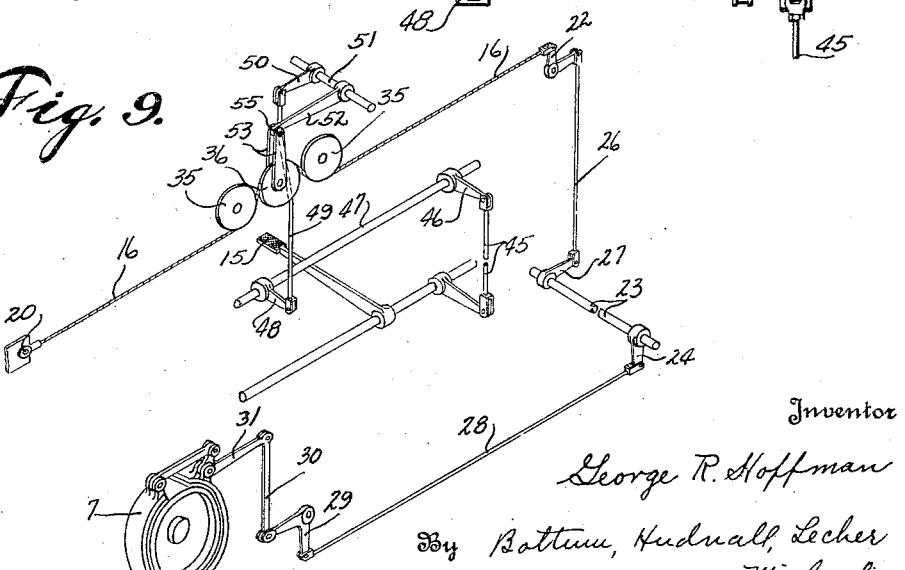
Inventor
George R. Hoffman
By Bottum, Hudnall, Lecher
McNamma & Michael
Attorney Patented Jan. 19, 1932

1,841,532

UNITED STATES PATENT OFFICE

GEORGE R. HOFFMAN, OF WEST ALLIS, WISCONSIN, ASSIGNOR, BY MESNE ASSIGNMENTS, TO HARNISCHFEGER CORPORATION, OF WEST MILWAUKEE, WISCONSIN, A CORPORATION OF WISCONSIN

OPERATING MECHANISM FOR CRANE BRAKES

Application filed March 12, 1928. Serial No. 261,146.

This invention relates to operating mechanism for bridge service brakes employed on travelling cranes.

As is well known, travelling cranes comprise in general a motor driven bridge spanning and having trucks riding on the rails of spaced runways and a motor driven trolley supported on the bridge for movement transversely thereof, the trolley carrying the hoisting mechanism. The drive mechanism for the bridge is equipped with a service brake to provide for retarding or stopping the bridge. In some types of travelling cranes a cab for the operator is suspended from the trolley and in this cab the controls are provided which regulate the drive or action of the bridge, trolley and hoisting mechanism. In such types of travelling cranes, the provision of simple, reliable and effective operating mechanism for the service brake on the bridge has presented a serious problem, a problem aggravated by the fact that the brake control is located in the cab which moves with the trolley along the bridge, whereas the service brake for the bridge is mounted at a fixed point on the bridge.

One of the objects of the invention is to provide an operating mechanism of this character which may be actuated and controlled from the cab suspended from the trolley in any position of the cab and trolley along the bridge to control the application and release of the service brake mounted on the bridge of the crane.

In carrying out the present invention the control of the service brake of the bridge is effected from a hand or foot lever located in the cab suspended from the trolley. The cab or the trolley on which the cab is suspended carries a plurality of pulleys over and under which a brake operating cable or line is trained. This brake operating line has one end anchored or dead ended on the bridge and has its other end connected with the service brake through motion transmission means mounted on the bridge. The transverse movements of the trolley which carries the cab causes the pulleys to run along the brake operating line, but this does not effect the control of the brake in the ordinary position of the pulleys as at such time the pulleys merely idle along the brake line. For the purpose of effecting the application and release of the brake, at least one of the pulleys is mounted for movement in such manner that it may be caused to coact with the other pulleys to place an operating tension on the brake line. The movement of this pulley is controlled from the hand or foot lever mounted in the cab.

Another novel feature of the invention resides in the provision of means on the bridge for preventing undue sagging and uncontrolled movement of the brake operating line.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a sectional view taken on line 3—3 of Figure 2;

Figure 4 is a similar view taken on line 4—4 of Figure 2;

Figure 5 is a detail sectional view on line 5—5 of Figure 2;

Figure 6 is a detail view illustrating the construction of the brake line support;

Figure 7 is an enlarged plan view of the lever and pulley arrangement used in the construction shown in Figure 1;

Figure 8 is a side view of the device shown in Figure 7; and

Figure 9 is a diagrammatic view showing in perspective the essential elements of Figure 1 used in operating the brake.

Figure 1:
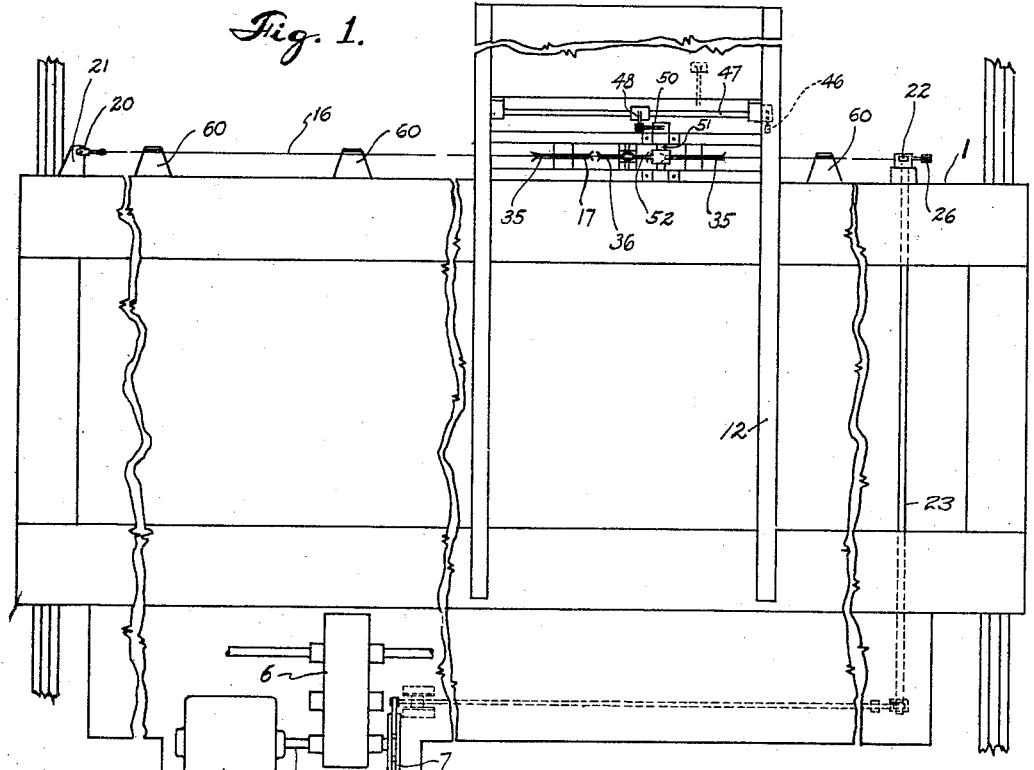
Figure 1 is a fragmentary plan view showing a crane equipped with the brake operating mechanism embodying the present invention.

Referring to the drawings, the numeral 1 designates the conventional bridge of a travelling crane which has the usual wheels 2 running on rails 3 of the supporting means. One pair of wheels 2 is driven in the conventional manner from an electric motor 5 by means of the usual gearing or drive mechanism designated diagrammatically at 6. When the bridge is to be stopped at any point along the trackway constituted by the rails 3, the motor 5 is shut off and the driving mechanism is braked. For this purpose, an extension of the armature shaft 5ª of the motor 5 is provided with a service brake designated generally at 7 and consisting of a pair of connected brake members 8 embracing a brake drum 9 fixed to the extension 5ª of the armature shaft (see Figure 3). These brake members 8 are supported in the usual manner on the bridge and are connected together by conventional linkage. Spring biased rods 10 operate to maintain the brake members normally released.

The present invention proposes operating mechanism for controlling the application or release of the brake from the cab 11 of the trolley 12. As the cab 11 is suspended from the trolley in the usual manner and the trolley is of conventional construction and runs back and forth on the bridge in accordance with conventional practice, these parts are shown diagrammatically in the drawings. In general the novel brake operating mechanism constituting the present invention comprises an operating lever such as a foot lever 15 mounted in the cab, a brake operating line or cable 16 mounted on the bridge, a pulley arrangement designated generally at 17 mounted on the trolley or cab and operatively associated with the brake operating line for tensioning and slackening the same, motion transmission means mounted on the cab and trolley and interposed between the foot lever 15 and the pulley arrangement 17 for controlling the action of the pulley arrangement, and motion transmission means mounted on the bridge and interposed between the brake operating line 16 and the brake 7 for causing the brake to be applied or released accordingly as the brake operating line 16 is tensioned or slackened.

Figure 2:
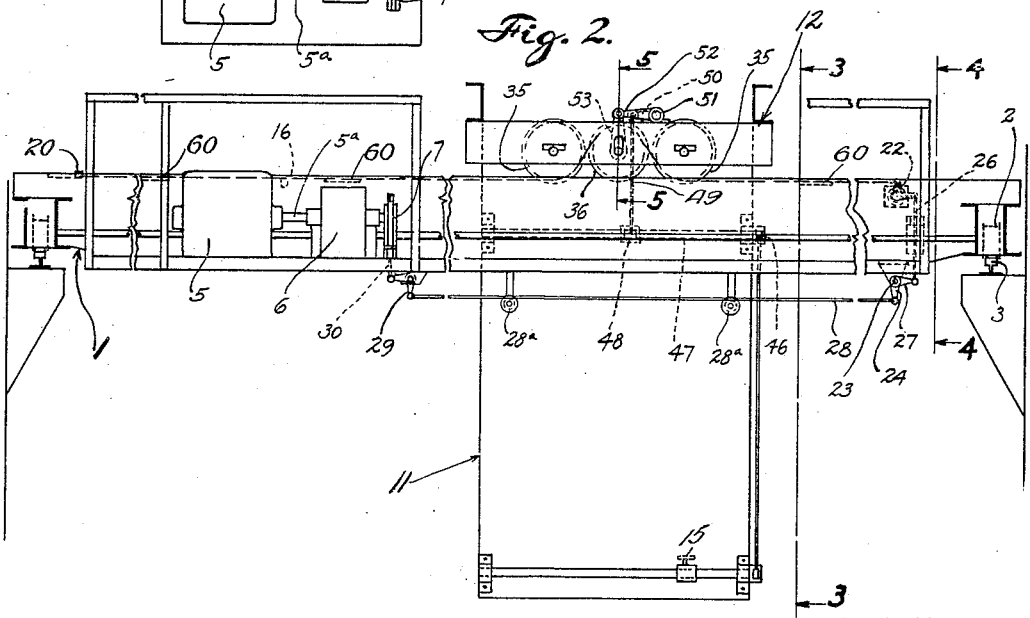
Figure 2 is a fragmentary view in side elevation of the parts shown in Figure 1.

Referring now to Figures 1 and 2, it will be seen that one end of the brake operating line 16 is dead-ended or anchored as at 20 to a bracket 21 fixed to the bridge of the crane. The opposite end of this brake operating line is connected to one arm of a bell crank lever 22 pivotally mounted on the bridge and having its other arm connected by a weighted connecting rod 26 to a crank arm 27 fixed to one end of a rock shaft 23 mounted on the bridge. The other end of the rock shaft has a crank arm 24 fixed thereto and operatively connected through a tie rod 28 with a bell crank lever 29 fulcrumed on the bridge and pivoted to the lower end of a brake rod 30 slidably mounted on the bridge in bearings constraining it to vertical movement and operatively connected with the brake 7 through a lever or the like 31. The tie rod 28 slides through roller supports 28ª. The weight of the rod 30 is counterbalanced by a spring 32. The weighted connecting rod 26 limits the amount of sag between the brake line supports to be hereinafter described and prevents application of the brake by the mere movement of the trolley along the bridge.

With this arrangement, when the brake line 16 is tensioned, it rotates the bell crank 22 in a counter-clockwise direction as viewed in Figure 2 and this motion of the bell crank 22 is exerted through the connecting rod 26 to cause a corresponding motion of the crank arm 27 and rock shaft 23. This motion of the rock shaft 23 is transmitted through the crank arm 24 and the tie rod 28 to rotate the bell crank 29 in a counter-clockwise direction as viewed in Figure 2 which pulls the brake operating rod 30 downwardly thereby straightening out and thrusting the lever 31 to the left as viewed in Figure 3, and forcing the brake members 8 into gripping engagement with the brake drum 9 to retard or stop the motion of the driving mechanism and of the bridge. When the brake line 16 is slackened, the spring biased rods 10 operate to release the brake.

The pulley arrangement 17 for controlling the tensioning and slackening of the brake line 16 consists in general of a pair of spaced pulleys 35 mounted for rotation about fixed axes on the trolley. Interposed between these relatively fixed pulleys 35 is a sliding pulley 36 which is raised and lowered under the influence of the foot lever 15. As shown in Figure 1, the brake line 16 extends under the pulleys 35 and over the pulley 36.

Referring now to Figure 5, it will be seen that the pulley 36 is rotatably mounted on a shaft or axis 37 and this shaft or axis 37 has squared bearings 38 fixed to its ends and slidably fitted in vertical guideways 39 mounted upon and secured to the structural channel members 40 embodied in the construction of the trolley. The lower ends of the guideways 39 are formed with stops 41 which engage the bearings 38 to limit the downward movement of the pulley 36. Lubricating means L may be provided, as illustrated in Figure 5.

The means for transmitting motion from the foot lever 15 to the movable pulley 36 is shown to advantage in Figures 2, 3, 4 and 5 and consists of a tie rod 45 extending between the treadle 15 and a crank arm 46 fixed to an intermediate shaft 47 rotatably mounted in bearings provided therefor on the cab. The shaft 47 has a second crank arm 48 spaced from the crank arm 46 and connected by a tie rod 49 to a crank arm 50 on a rock shaft 51 supported on top of the trolley and extending parallel to the axis 37 of the pulley 36. At a point spaced from the crank arm 50, the rock shaft 51 has a second crank arm 52 which is pivotally connected to the upper end of a yoke 53. As shown in Figure 5, the yoke 53 has spaced plates 54 pivotally connected as at 55 to the crank arm 52 and having bearings 56 adjacent their lower ends in which portions of the axis 37 of pulley 36 are rotatably fitted.

From the foregoing, it will be understood that when the foot treadle 15 is depressed, the intermediate arm 46 will be rotated in a clockwise direction as viewed in Figure 3 and the rock shaft 51 will also be rotated in a clockwise direction as viewed in Figure 2. This rotation of the rock shaft 51 raises the crank arm 52 and its yoke 53 and also raises the pulley 36 to take up the slack in the brake line 16 and to tension this brake line to such an extent as to cause it to apply the brake 7 to the desirable extent. It will be understood that the tension of the brake line 16 is transmitted to the brake through the bell crank 22, connecting rod 26, crank arm 27, rock shaft 23, crank arm 24, tie rod 28, bell crank 29, brake rod 30 and thrust lever 31. This control of the brake may be exercised irrespective of the positioning of the trolley along the bridge. As the trolley moves along the bridge, the pulleys run or idle along the brake line 16 without materially affecting its tension.

When the brake line 16 is slackened, it tends to and does sag considerably despite the action of the weighted connecting rod 26 and this is very undesirable, as the brake line is apt to become fouled or to be swung out to engagement with its pulleys 35 when the bridge is moved. To preclude this, a plurality of spaced brake line supports designated generally at 60 are mounted at spaced points along the bridge and underlie the cable so as to engage and support the same at a plurality of spaced points when the cable is slackened. The supports 60 may be bolted, riveted or welded to the bridge. The construction of these supports is shown in detail in Figure 6 and as shown, each support comprises a body plate 61 adapted for attachment to the bridge and having an upturned lug 62 at its outer end to prevent the brake line from sliding off the end of the same. These supports distribute the sag of the brake line to prevent it from hanging down so far as to be likely to be fouled and further they constrain the brake line against uncontrolled swinging or whipping movements and keep it properly engaged with its pulleys. Another very important advantage follows from the use of the spaced support 60 and that is that these supports operate to control or minimize the sag of the brake line 16. By reducing the sag of this brake line to a minimum only a slight vertical movement of the movable pulley 36 is necessary to apply such a pull upon the bell crank 22 as to apply the brake. In order to apply the brake, any slack in the line must first be taken up. By providing the supports 60 the line 16 may be stretched tightly without raising the link 26, since the weight of the line does not exert a force on the link 26.

I claim:

1. Operating mechanism for controlling a service brake of a crane bridge from the cab of the crane trolley comprising a brake line mounted on the bridge of the crane, motion transmission mechanism on the bridge for connecting the brake line with the service brake, a pulley arrangement on the trolley through which the brake line runs, said pulley arrangement having a movable pulley controlling the tension of the brake line, a control lever in the cab, and motion transmission means between the lever and the movable pulley.

2. Operating mechanism for controlling a service brake of a crane bridge from the cab of the crane trolley comprising a brake line mounted on the bridge of the crane, motion transmission mechanism on the bridge for connecting the brake line with the service brake, a pulley arrangement on the trolley through which the brake line runs, said pulley arrangement having a movable pulley controlling the tension of the brake line, means for actuating the pulley including a brake control lever in the cab, motion transmission means between the control lever and the movable pulley, and a plurality of spaced supports on the bridge engageable with the brake line when slackened.

3. Operating mechanism for controlling a service brake of a crane bridge from the cab of the crane trolley including a brake line mounted on the bridge, motion transmission mechanism for connecting the brake line and the service brake, a pulley arrangement on the trolley through which the brake line runs, said pulley arrangement including a movable pulley having its axis projecting beyond the pulley and formed with bearings, guides on the trolley receiving the bearings for vertical sliding movement, a control lever in the cab and motion transmission means between the control lever and the movable pulley for raising and lowering the movable pulley to control the tensioning and slackening of the brake line.

4. Operating mechanism for controlling a service brake of a crane bridge from the cab of the crane trolley including a brake line mounted on the bridge, motion transmission mechanism for connecting the brake line and the service brake, a pulley arrangement on the trolley through which the brake line runs, said pulley arrangement including a movable pulley having its axis projecting beyond the pulley and formed with bearings, guides on the trolley receiving the bearings for vertical sliding movement, a yoke connected to the axis of the movable pulley, a rock shaft having a crank arm connected to the yoke, a control lever in the cab, and motion transmission means between the control lever and the rock shaft.

5. Operating mechanism for controlling a service brake of a crane bridge from the cab of the crane trolley, comprising a brake line having one end dead ended on the bridge, motion transmission means connected to the other end of the brake line for operating the service brake, a pair of pulleys mounted for free rotation about a fixed axis and under which the brake line runs, a movable pulley interposed between the fixed pulleys and over which the brake line runs, means for constraining the movable pulley to vertical movement and for limiting the downward movement of the same, a control lever in the cab and motion transmission means between the control lever and the movable pulley.

In witness whereof, I hereto affix my signature.

GEO. R. HOFFMAN.